United States Patent [19]

Watanabe et al.

[11] Patent Number: 5,728,467
[45] Date of Patent: Mar. 17, 1998

[54] MULTILAYERS LAMINATE SERVING AS A GOOD BARRIER AGAINST AN OXYGEN GAS OR THE LIKE AND HEAT-SEALABLE PACKING MATERIAL COMPRISING THE SAME

[75] Inventors: Kazuyuki Watanabe, Oita; Juichi Kasai, Tokyo; Akio Harada; Wei-Zhong Zhang, both of Hyogo-ken, all of Japan

[73] Assignees: Showa Denko K.K., Tokyo; Showa Highpolymer Co., Ltd., Chiyoda-ku, both of Japan

[21] Appl. No.: 603,095

[22] Filed: Feb. 20, 1996

Related U.S. Application Data

[63] Continuation of Ser. No. 235,918, filed as PCT/GB93/00535, Mar. 15, 1993, abandoned.

[51] Int. Cl.$^6$ .................................................. B32B 9/04
[52] U.S. Cl. .................. 428/411.1; 428/412; 428/423.5; 428/423.7
[58] Field of Search .................................. 428/215, 216, 428/341, 336, 461, 411.1, 412, 423.5, 423.7

[56] References Cited

U.S. PATENT DOCUMENTS

| | | | |
|---|---|---|---|
| 3,442,686 | 5/1969 | Jones | 428/336 |
| 4,559,266 | 12/1985 | Misasa et al. | 428/341 |
| 4,661,395 | 4/1987 | Akao | 428/213 |
| 4,702,903 | 10/1987 | Keefer | 423/359 |
| 5,004,649 | 4/1991 | Yamasaki et al. | 428/461 |
| 5,100,720 | 3/1992 | Sawada et al. | 428/215 |
| 5,112,673 | 5/1992 | Sawada et al. | 428/216 |

FOREIGN PATENT DOCUMENTS

| | | |
|---|---|---|
| 568000 | 12/1987 | Australia . |
| 0 096 581 A1 | 12/1983 | European Pat. Off. . |
| 0 337 316 A1 | 10/1989 | European Pat. Off. . |
| 0 566 053 A1 | 10/1993 | European Pat. Off. . |
| 8703556 | 6/1987 | Germany . |
| 49-41469 | 4/1974 | Japan . |
| 60-23037 | 2/1985 | Japan . |
| 60-96637 | 5/1985 | Japan . |
| 63-108016 | 5/1988 | Japan . |

Primary Examiner—Terressa Mosley
Attorney, Agent, or Firm—Armstrong, Westerman, Hattori, McLeland & Naughton

[57] ABSTRACT

A multilayered laminate, which comprises a plastic substrate, a thin film of a metal or a metal oxide, formed on a surface of the substrate, and a layer formed on a surface of the thin film, the layer being selected from the group consisting of: (a) a polyvinyl alcohol copolymer emulsion, obtained by aqueous emulsion polymerization of a vinyl acetate monomer, an ethylene monomer and a polyvinyl alcohol; (b) a resin emulsion composition obtained by mixing (i) a polyvinyl alcohol copolymer emulsion, obtained by aqueous emulsion polymerization of a vinyl acetate monomer, an ethylene monomer and a polyvinyl alcohol with (ii) an aqueous solution of polyvinyl alcohol resin; (c) saponified resin of olefin-vinyl acetate copolymer; (d) polyamide resin; and (e) polyvinyl alcohol resin, and a heat-sealable packaging material based on the multilayered laminate.

18 Claims, No Drawings

MULTILAYERS LAMINATE SERVING AS A GOOD BARRIER AGAINST AN OXYGEN GAS OR THE LIKE AND HEAT-SEALABLE PACKING MATERIAL COMPRISING THE SAME

This application is a continuation of application Ser. No. 08/235,918 filed as PCT/GB93/00535 Mar. 15, 1993 now abandoned.

BACKGROUND OF THE INVENTION

1) Field of the Invention

The present invention relates to a multi-layered laminate serving as a good gas barrier against an oxygen gas or the like and having a good preservability for flavor components and a good resistance to bending, flexing, etc. and also to a heat-sealable packaging material comprising the same which is suitable for food preservation packaging materials or the like.

2) Prior Art

Markets for refrigerated food, chilled food and retort package food have been recently expanded rapidly in the food field. These kinds of food are characterized by prolonged preservability, freshness and easy cooking and their future spread will be more and more expectable as food that can meet the consumers' needs.

In the field of packaging materials for these kinds of food, for example, films, sheets, pouches, tubes, bottles, etc., materials serving as a better gas barrier against an oxygen gas or the like are now desired to meet a prolonged preservation.

Theretofore, laminates each comprising a plastic substrate and a metal or metal oxide film formed on the surface of the plastic substrate have been developed as materials serving as a good gas barrier. To make the laminate the following processes have been proposed. For example, processes for vapor deposition of a thin film of metal such as aluminum, etc., and processes for lamination of a thin film of metal oxide such as silicon oxide, etc. by vapor deposition or sputtering are disclosed in JP-A-49-41469; JP-A-60-23037; U.S. Pat. No. 3,442,686 and U.S. Pat. No. 4,702,903. These laminates have been used upon further lamination of a polyolefin film such as a polyethylene film or a polypropylene film thereon as a protective film for preventing the thin film from cracking due to flexing or as an adhesive layer for giving a heat adhesion thereto.

In order to obtain laminates having highly superior gas barrier property, it is necessary to make the thin film of metal or metal oxide far thicker than hitherto. Metal or metal oxide will be hereinafter referred to as "metal". However, the resulting thin film turns so brittle that cracks or pinholes are more liable to be formed. That is, the laminates can no more work as gas barriers and there is a limit to the gas barrier performance.

One of important commercial values of packed food is preservation of flavor, one element of food taste. Deterioration of flavor itself can be deterioration of food as a commercial product. The flavor consists of a large number of organic compounds contained as micro flavor components in food and specific flavor of the food is based on a balance of vapor concentrations or partial vapor pressures of the respective organic compounds as micro flavor components. Micro flavor components include, for example, terpene hydrocarbons, terpene alcohols, aldehydes, esters, etc.

Polyolefin resin is used for the heat seal layer as the innermost layer of food packaging material for preserving the flavor from the viewpoint of heat sealability. However, the polyolefin resin has such a problem that the resin absorbs the flavor from the packed food to some extent.

SUMMARY OF THE INVENTION

An object of the present invention is to provide a multi-layered laminate serving as a good gas barrier over the prior art limit level and having a good flavor preservability and a good resistance to bending or flexing.

As a result of extensive studies, the present inventors have found that a remarkable gas barrier property can be surprisingly obtained by further laminating the surface of a laminate comprising a plastic substrate and a thin film of metal or the like, formed on the plastic substrate with a specific resin or a resin emulsion composition, thereby attaining the object of the present invention.

According to one aspect of the present invention, there is provided a multilayered laminate, which comprises a plastic substrate, a thin film of a metal or a metal oxide, formed on a surface of the substrate, and a layer formed on a surface of the thin film, the layer being selected from the group consisting of:

(a) a polyvinyl alcohol copolymer emulsion having an ethylene content of 1 to 50% by weight, obtained by aqueous emulsion polymerization of a vinyl acetate monomer, an ethylene monomer and a polyvinyl alcohol initially present in an amount of 15 to 60% by weight based on the total weight of the polyvinyl alcohol and the vinyl acetate monomer;

(b) a resin emulsion composition obtained by mixing (i) a polyvinyl alcohol copolymer emulsion having an ethylene content of 1 to 50% by weight, obtained by aqueous emulsion polymerization of a vinyl acetate monomer, an ethylene monomer and a polyvinyl alcohol initially present in an amount of 3 to less than 15% by weight based on the total weight of the polyvinyl alcohol and the vinyl acetate monomer with (ii) an aqueous solution of polyvinyl alcohol resin in a ratio of the total weight of the polyvinyl alcohol to the total weight of the polyvinyl alcohol and the vinyl acetate monomer of 15% by weight or more;

(c) saponified resin of olefin-vinyl acetate copolymer;

(d) polyamide resin; and (e) polyvinyl alcohol resin.

According to another aspect of the present invention, there is provided a heat-sealable packaging material, which comprises a multilayered laminate comprising a plastic substrate, a thin film of a metal or a metal oxide, formed on a surface of the substrate, and a layer formed on a surface of the thin film, the layer being selected from the group consisting of:

(a) a polyvinyl alcohol copolymer emulsion having an ethylene content of 1 to 50% by weight, obtained by aqueous emulsion polymerization of a vinyl acetate monomer, an ethylene monomer and a polyvinyl alcohol initially present in an amount of 15 to 60% by weight based on the total weight of the polyvinyl alcohol and the vinyl acetate monomer;

(b) a resin emulsion composition obtained by mixing (i) a polyvinyl alcohol copolymer emulsion having an ethylene content of 1 to 50% by weight, obtained by aqueous emulsion polymerization of a vinyl acetate monomer, an ethylene monomer and a polyvinyl alcohol initially present in an amount of 3 to less than 15% by weight based on the total weight of the polyvinyl alcohol and the vinyl acetate monomer with (ii) an aqueous solution of polyvinyl alcohol resin in a ratio of the total weight of the polyvinyl alcohol to the total weight of the polyvinyl alcohol and the vinyl acetate monomer of 15% by weight or more;

(c) saponified resin of olefin-vinyl acetate copolymer;

(d) polyamide resin; and (e) polyvinyl alcohol resin.

DETAILED DESCRIPTION OF THE INVENTION

The present invention will be described in detail below:

In the present invention, ordinary thermoplastic resin can be used for the plastic substrate. Specifically, the thermoplastic resin for the plastic substrate in the present invention includes, for example, polyolefin resins such as polyethylene, polypropylene, polyisoprene, polybutene, poly-3-methylbutene-1, poly-4-methylpentene-1, polybutadiene, polystyrene and copolymers of constituent monomers of the foregoing polymers (e.g. ethylene/propylene copolymer, linear low density polyethylenes containing butene-1, 4-methylpentene-1, hexene-1, octene-1, or the like as a comonomer, block copolymer of propylene/ethylene, styrene/butadiene copolymer, mixtures, graft products, cross-linked products, block copolymers, etc. of these resins), ethylene/vinyl acetate copolymer and its partial or complete saponification products, halogen-containing polymers (e.g. polyvinylidene chloride, polyvinyl chloride, polyvinyl fluoride, polyvinylidene fluoride, polychloroprene, chlorinated rubber, etc.), polymers of unsaturated carboxylic acids and their derivatives (e.g. polyalkyl methacrylate, polyalkyl acrylate, polyacrylonitrile, copolymers of constituent monomers of the foregoing polymers with other monomers, such as acrylonitride/styrene copolymer, ABS resin, ethylene/alkyl acrylate copolymer, ethylene/glycidyl methacrylate copolymer, ethylene/methacrylic acid copolymer and its ionic cross-linked products, etc.), polyacetal, polycarbonate, polyester (e.g. polyethylene terephthalate, polybutylene terephthalate, etc.), polyamide (which will be hereinafter referred to as PA), polyphenylene oxide, polysulfone, etc.

Among these thermoplastic resins, polyolefin resins, particularly polyethylene, polypropylene, polyisoprene, polybutene, poly-3-methylbutene-1, poly-4-methylpentene-1, ethylene/propylene copolymer, linear polyethylenes containing butene-1, 4-methylpentene-1, hexene-1, octene-1, or the like as a comonomer, block copolymer of propylene/ethylene, polyester and PA, or their mixtures are preferably used for the plastic substrate from the viewpoint of easy handling.

The metal for use in the laminating of the plastic substrate in the present invention includes, for example, simple metals such as aluminum, titanium, chrominum, nickel, etc., and metal oxides such as aluminum oxide, silicon oxide, titanium oxide, ferrite, indium oxide, etc. These metals and metal oxides can be deposited as a layer on the surface of the plastic substrate according to a known procedure such as vapor deposition, sputtering, etc.

Polyvinyl alcohol copolymer emulsion as components (a) and (b)(i) used in the present multi-layered laminate can be obtained by polymerization of vinyl acetate with ethylene in the presence of a known catalyst, while making polyvinyl alcohol, which will be hereinafter referred to as PVA, in an aqueous emulsion, as disclosed in JP-A-60-96637 and JP-A-63-108016.

It seems that in the resulting PVA copolymer emulsion PVA is integrated with ethylene-vinyl acetate copolymer and the PVA copolymer emulsion takes a form of copolymers comprising PVA, vinyl acetate and ethylene as constituent units.

PVA for use in the reaction is partial or complete saponification product of polyvinyl alcohol, and any degree of saponification can be employed. Preferable average degree of saponification is 50 to 99%, and particularly average degree of saponification of 80 to 99% and an average degree of polymerization of 20 to 5,000 are preferable.

The amount of PVA initially present at the polymerization of the aqueous emulsion is 15 to 60% by weight, preferably 15 to 55% by weight, particularly preferably 20 to 55% by weight based on the total weight of the vinyl acetate and PVA in case of (a). When the amount of the initial present PVA is less than 15% by weight, no better gas barrier property is obtained, whereas above 60% by weight the viscosity will be increased during the reaction, resulting in difficult temperature control.

In case of (b)(i), the amount of the initially present PVA is 3% by weight to less than 15% by weight, preferably 5 to 14% by weight. When the amount of the initially present PVA is less than 3% by weight, polymerization is not stabilized during the reaction, whereas at or above 15% by weight compatibility with the aqueous solution of PVA resin is sometimes deteriorated.

The content of ethylene as a constituent unit in the PVA copolymer obtained according to the above-mentioned process is 1 to 50% by weight, preferably 10 to 45% by weight. When the content of ethylene as the constituent unit is over 50% by weight, the compatibility with PVA is deteriorated and thus the ethylene content of more than 50% by weight is not suitable for the object of the present invention. Below 1% by weight the melt moldability is poor.

The content of vinyl acetate as another constituent unit is not particularly limited, but is preferably 1 to 89% by weight. Below 1% by weight the melt moldability is poor, whereas above 89% by weight no better gas barrier property can be obtained.

The PVA copolymer resin can be further copolymerized with other third component monomer than vinyl acetate monomer and ethylene monomer. Examples of the other third component monomer include unsaturated carboxylic acids such as acrylic acid, methacrylic acid, crotonic acid, maleic acid, fumaric acid, itaconic acid, etc., or their alkyl esters, and α-olefins such as propylene, butene, decene, octadecene, etc.

The thus obtained PVA copolymer emulsion has a solid concentration of preferably 15% by weight or more, particularly preferably 20 to 70% by weight.

The PVA resin as component (b)(ii) in the resin emulsion composition (b) for use in the present multilayered laminate is partial or complete saponification products of polyvinyl acetate or its modified PVA.

The modified PVA is partial or complete saponification products of the following copolymers: copolymers of vinyl acetate with olefins having 4 to 18 carbon atoms, copolymers of vinyl acetate with vinyl carboxylates such as vinyl versatate, vinyl stearate, etc., copolymers of vinyl acetate with alkylvinyl ethers such as laurylvinyl ether, methylvinyl ether, etc., copolymers of vinyl acetate with (meth)acrylates such as methyl methacrylate, etc., copolymers of vinyl acetate with acrylamide, methacrylamide, N,N-dimethylacrylamide, etc., copolymers of vinyl acetate with unsaturated carboxylic acids or their anhydrides or esters such as acrylic acid, crotonic acid, fumaric acid, itaconic acid, etc., copolymers of vinyl acetate with sulfonic acid monomers such as vinylsulfonic acid, acrylsulfonic acid, etc., copolymers of vinyl acetate with cationic monomers such as dimethylaminoethyl methacrylate, vinylimidazole, vinylpyridine, vinyl succinimide, etc., and copolymers of vinyl acetate with other monomers such as vinylene carbonate, allyl alcohol, allyl acetate, etc.

The degree of polymerization of the thus obtained PVA resin is not particularly limited and can be selected as desired in view of its application field, etc. Usually the PVA resin having a degree of polymerization of 100 to 3,000 is preferable. From the viewpoint of coatability, melt flowability, mechanical strength, etc., the PVA resin having a degree of polymerization of 200 to 1,800 is particularly preferable. Degree of saponification is preferably 50% by mole or more. From the viewpoint of gas barrier property and melt flowability a degree of saponification of 70 to 99.5% by mole is more preferable. Below a degree of saponification of less than 50% by mole, no better mechanical strength can be obtained, whereas above 99.5% by mole no better melt flowability can be obtained.

A mixing ratio of the component (b)(i) to the component (b)(ii) in the resin emulsion composition must be so that the total weight of vinyl alcohol constituent unit can be 15% by weight or more, preferably 20 to 90% by weight on the basis of total weight of the vinyl alcohol constituent unit and the vinyl acetate constituent unit. When the total weight of vinyl alcohol constituent unit is less than 15% by weight, the gas barrier property is not satisfactory and thus the object of the present invention cannot be attained. Above 90% by weight, the coating film will be hard and brittle.

The PVA copolymer emulsion (a) and the resin emulsion composition (b) must be laminated to a thickness of 3 μm or more, preferably 5 μm or more, on the dry basis after drying. When the thickness is less than 3 μm, no better gas barrier property can be obtained, and thus the object of the present invention cannot be attained. The thickness has no particular upper limit, but from the viewpoint of economy the thickness is preferably not more than 80 μm.

Saponified resin of olefin-vinyl acetate copolymer (c) for use in the present invention can be prepared by saponifying the copolymer obtained by radical polymerization of olefin with vinyl acetate.

Olefins for use in the saponified resin of the olefin-vinyl acetate copolymer (c) include, for example, α-olefins having 2 to 12 carbon atoms, among which ethylene is most preferable from the viewpoint of easy polymerization and distinguished gas barrier property of the saponified product of ethylene-vinyl acetate copolymer.

The olefin content and degree of saponification of the saponified product of olefin-vinyl acetate copolymer (c) are not particularly limited, but the olefin content is preferably 15 to 60% by weight, more preferably 20 to 50% by weight. When the olefin content is less than 15% by weight, the melt extrusion molding is hard to carry out, whereas above 60% by weight the gas barrier property is sometimes lowered.

The degree of saponification is preferably 90% by mole or more, and more preferably 96% by mole or more. When the degree of saponification is less than 90% by mole, the gas barrier property is not satisfactory.

The thickness of the saponified resin layer of olefin-vinyl acetate copolymer (c) in the present multi-layered laminate must be at least 1 μm. Below 1 μm, the desired gas barrier property cannot be obtained. The larger the thickness, the more improved the gas barrier property. From the viewpoint of gas barrier property and economy it is not necessary that the thickness is more than 50 μm. Usually a thickness of 3 to 40 μm is selected from this viewpoint.

PA resin (d) for use in the present invention is not particularly limited, and those described in "Polyamide resin Handbook" published by Nikkan Kogyo Shinbun-sha, Japan on Jan. 30, 1988 can be used. For example, polycondensates of dibasic acids and diamines can be used. Specifically they include polymers of ε-caprolactam, aminolactam, enantholactam, 11-aminoundecanbic acid, 7-aminohentanoic acid, 9-aminonopanoic acid, α-pyrrolidone, α-piperidone, etc., polycondensates of diamines such as hexamethylenediamine, nonamethylenediamine, undecanemethylenediamine, dodecamethylenediamine, metaxylylenediamine, etc., with dicarboxylic acids such as terephthalic acid, isophthalic acid, adipic acid, sebacic acid, dodecane dibasic acid, glutaric acid, etc., or their copolymers. More specifically, they also include, for example, nylon-4, nylon-6, nylon-7, nylon-8, nylon-11, nylon-12, nylon-6,6, nylon-6,9, nylon-6,10, nylon-6,11, nylon-6,12, nylon MXD, etc.

The thickness of PA resin layer must be at least 1 μm, because below 1 μm the gas barrier property is not satisfactory. From the viewpoint of economy, the thickness is preferably 3 to 40 μm.

PVA resin (e) for use in the present invention is the same PVA as that (b)(ii).

The thickness of the PVA resin layer (e) must be at least 3 μm. Below 3 μm, no desired gas barrier property can be obtained. The larger the thickness, the more improved the gas barrier property. From the viewpoint of gas barrier property and economy a thickness of more than 50 μm is not necessary. Usually a thickness of 3 to 40 μm is selected from this viewpoint.

The present multilayered laminate can be utilized in various applications, for example, heat-sealable packaging materials. When the layer materials (a), (b), (c) and (d) of the present invention are used as heat-sealable layers, the thickness of the laminate must be at least 5 μm on the dry basis from the viewpoint of seal strength.

When a multilayered laminate comprising the layer material (e) is used as a heat-sealable packaging material, it is necessary to further laminate a polypropylene layer as a heat-sealable layer.

The present layer materials (a), (b), (c), (d) and (e) are applied to the surface of a thin film of a metal or metal oxide formed on the plastic substrate in the following coating procedure: the PVA copolymer emulsion composition (a) and the resin emulsion composition (b) are directly applied in an emulsion state to the surface of a thin film of a metal or metal oxide formed on the plastic substrate and dried, or the emulsions are dried and the resulting solid matters are melt molded onto the surface of the thin film by an extruder, or lamination can be carried out with a known anchor coating agent or a dry lamination adhesive.

The layer materials (c), (d) and (e) can be laminated according to a known procedure, for example, by dissolution in a solvent and coating with the resulting solution, by lamination of films obtained by extrusion molding, or by simultaneous extrusion-lamination.

Coating can be carried out according to a known coating procedure, for example, by an air knife method, a gravure roll method, a reverse roll method, a bar coat method, a dip coat method, a spray method, a brush coat method, an electrostatic coating method, a centrifugal coating method, a flow spread coating method, an electrophoresis coating method or their combinations. Coating can be carried out in one run or by multistage coating including two-stage coating.

After the coating, drying is carried out in a drying furnace of arch type, floating type or the like, or a high frequency heating drier.

PREFERRED EMBODIMENTS OF THE INVENTION

The present invention will be described in detail below, referring to Examples, where the following test procedures were used.

Determination of Volume of Permeated Oxygen

Oxygen transmission rate was determined by OXTRAN type 10/50 A, made by Modern Control, Ltd., under such conditions as temperature 23° C. and relative humidity 65% and temperature 23° C. and relative humidity 90% according to ASTM D3985-81.

Flexal Fatigue Test

Laminates were subjected to a flexal fatigue test with a Gelbo flex tester, made by Tester Sangyo K.K., Japan, which had a cylinder diameter of 90 mm, a stroke of 178 mm, a twist angle of 440°, a twist stroke of 89 mm, a linear stroke of 63.5 mm and a reciprocating rate of 40 runs/minute, by flexing the laminate, at every 10 runs up to 100 flex runs, and at every 50 runs over 100 flex runs. The flex run number of the Gelbo flex tester was changed and at each stage permeated oxygen was quantitatively determined at 23° C. and 65% RH when the vapor deposited layer is broken due to a flexal fatigue, the volume of permeated oxygen is increased. Thus, the flexal fatigue can be determinated easily according to this procedure.

Flavor Preservability Test

Pouches were prepared from multilayered laminates and a solution containing various flavor components was sealed into the pouches. After a predetermined time, the flavor components sorbed into the inside film each of the pouches were extracted and quantitatively determined by gas chromatography. The larger the amount of sorbed flavor components, the lower the flavor preservability.

A specific procedure for the determination is given below:

Multilayered laminates for the flavor preservability test were prepared by dry laminating an aluminum foil having a thickness of 9 μm onto the surface corresponding to the outside surfaces of pouches through a polyethylene terephthalate film having a thickness of 12 μm. An adhesive AD 950 A/B made by Toyo Morton K.K., Japan was used in the dry laminating, followed by aging in a thermostat room at 40° C. for 4 days. The adhesive was applied at 4 g/m² on the dry basis.

The flavor preservability test was carried out on some of Examples and Comparative Examples. Pouches, 18 cm×10 cm, were prepared by heat sealing so that the present resin layer could be provided on the inside surface in Examples and a polypropylene resin layer could be provided on the inside surface in Comparative Examples. Then, 300 ml of an aqueous surfactant solution containing various flavor components (an aqueous 0.5% solution of Ryoto Sugar Ester S-1170, made by Mitsubishi Kasei Shokuhin K.K., Japan) was sealed into each of the pouches and kept in a thermostat room at 23° C. for 70 days. Then, the pouches were opened and the flavor components sorbed into the film on the inside surface of each of the pouches were extracted with ether and also the flavor components remaining in the aqueous detergent solution was extracted with ether. Then, the extracted flavor components were quantitatively determined by gas chromatography and the amount of sorbed components and that of remaining components were calculated in terms of the original aqueous solution concentrations. From the thus obtained results, a distribution ratio of sorbed flavor components was obtained according to the following formula:

Distribution ratio=amount of sorbed components/amount of remaining components

That is, the larger the distribution ratio, the higher the sorption of flavor components. At a distribution ratio of 1, a half of the flavor components contained in the aqueous solution before sealing was sorbed into the inside layer of each of the pouches, and as the distribution ratio is larger than 1, the concentration of the flavor components remaining in the aqueous solution is decreased.

Symbols for flavor components:

A: myrcene
B: d-limorene
C: n-caproic acid ester
D: linalool
E: n-octyl alcohol

EXAMPLES AND COMPARATIVE EXAMPLES

Deposited film (1) Substrate
  PET  Lumilar P11, made by Torak K.K., Japan, 12 μm thick
  CPP: Sho-Allomer, made by Showa Denko K.K., Japan
       50 μm thick for all Examples using CPP and Comparative Examples 4, 7 and 10
       60 μm thick for Comparative Example 11
  Note
  PET: Polyester film
  CPP: Casted polypropylene film (2) Vapor-deposited film
  Materials:           SiO (silicon monoxide)
                       Al (aluminum)
  Thickness of deposit: 300, 500, 600 and 1,100 Å for Examples 1 to 17 and Comparative Examples 1 to 6
                       700 Å for Examples 18 to 56 and Comparative Examples 7 to 11

Laminate materials (1) PVA copolymer emulsion (as will be herinafter abbreviated to EP)

| | | |
|---|---|---|
| EP-1 | PVA content | 25% by weight |
| EP-2 | " | 50% by weight |
| EP-3 | " | 14% by weight |
| EP-4 | " | 5% by weight |

Note  PVA content: ratio of polyvinyl alcohol to total of polyvinyl alcohol and vinyl acetate by weight (2) Resin emulsion composition (as will be hereinafter abbreviated to CP)

| | | |
|---|---|---|
| CP-1 | PVA content | 60% by weight |
| CP-2 | " | 15% by weight |
| CP-3 | " | 35% by weight |
| CP-4 | " | 80% by weight |
| CP-5 | dired product of CP-1 | |
| CP-6 | PVA content | 10% by weight for Comparative Examples |

(3) EVOH (as will be hereinafter abbreviated to EV)

| | |
|---|---|
| EV-1 | Soarnol DT solution |
| EV-2 | Soranol A solution |
| EV-3 | Soarnol 30L |
| EV-4' | Soarnol DT |

Note  EVOH: saponified product of ethylene-vinyl acetate copolymer (4) PA resin (as will be hereinafter abbreviated to PA)

| | |
|---|---|
| PA-1 | Amylan CM4000, made by Toray K.K., Japan, solution |
| PA-1 | Amylan CM4001, made by Toray K.K., Japan, solution |
| PA-3 | Amylan CM8000, made by Toray K.K., Japan, solution |
| PA-4 | Nylon-6, 1022B, made by Ube Kosan K.K., Japan m.p 196° C. |
| (5) PVA resin (as will be hereinafter referred to as PV) | |
| PV-1 | Gohsenol GL 03, aqueous solution, made by Nihon Gohsei Kagaku K.K., Japan, degree of polymerization: 300; degree of saponification: 86.5–89% by mole |
| PV-2 | Poval PVA 105 aqueous solution, made by Kuraray K.K., Japan, degree of polymerization: 500; degree of saponification: 98.5 ± 0.5% by mole |
| PV-3 | Poval PVA 117 aqueous solution, made by Kuraray K.K., Japan, degree of polymerization: 1,700; degree of saponification: 98.5 ± 0.5% by mole |
| PV-4 | Poval PVA 224 aqueous solution, made by Kuraray K.K., Japan, degree of polymerization: 2,400; degree of saponification: 88.0 ± 1.5% by mole |

Vapor Deposition of a Thin Film of a Metal or Metal Oxide onto the Surface of a Plastic Substrate SiO or Al was vacuum vapor deposited on one side of a commercially available PET or CPP to a predetermined thickness. The vacuum vapor deposition was carried out in a vacuum vapor deposition apparatus, type EBH6, made by Nippon Shinku Gizyutsu K.K., Japan, using a tungsten board as a heating resistor, a vapor source having a purity of 99.99% or more in a vacuum degree of 2×10 Torr. The thickness of the vacuum vapor deposited film was calculated on the basis of weight.

(a) Preparation of PVA copolymer emulsions

Emulsion polymerization was carried out in an autoclave having a net capacity of 30 l, using partially saponified PVA resin having a degree of polymerization of 500 and a degree of saponification of 88% by mole, PVA 205, made by Kurare K.K., Japan, while successively adding ammonium persulfate and sodium metabisulfite as catalysts thereto and changing a vinyl acetate concentration and an ethylene gas pressure, thereby obtaining PVA copolymer emulsions (EP-1 to EP-4). The thus obtained emulsions had a solid concentration of about 20 to about 60% by weight.

(b) Preparation of resin emulsion compositions

PV (PV-1) was dissolved in water at 70° C. with heating to prepare an aqueous solution having a viscosity (23° C.) of 2,700 cps and a polymer concentration of 30% by weight, and then mixed with the above-mentioned PVA copolymer emulsion (EP-3) to prepare resin emulsion compositions (CP-1 to CP-4) having different PVA contents.

For comparison, PV-1 was mixed with EP-4 to prepare CP-6.

(c) Preparation of EVOH solutions

Soarnol DT having an ethylene content of 29% by mole and a degree of saponification of more than 99% by mole, a product made by Nihon Gohsei K.K., Japan and Soarnol A having an ethylene content of 44% by mole and a degree of saponification of more than 90% by mole, a product made by Nihon Gohsei Kagaku K.K., Japan, were used as EVOH and dissolved in a solvent mixture of distilled water and n-propyl alcohol in a mixing ratio of the former to the latter of 45/55% by weight each with stirring at 70° C. to make a polymer concentration of 15% by weight, thereby preparing EVOH solutions (EV-1 or EV-2).

As a commercially available EVOH solution, Soarnol 30L, a product made by Nihon Gohsei Kagaku K.K., Japan, was used at a copolymer concentration of 30% by weight in a solvent mixture of water and the alcohol (EV-3).

(d) Preparation of PA resin solutions

Amylan CM4000, Amylan CM4001 and Amylan CM8000, products made by Toray K.K., Japan as alcohol-soluble nylons, were dissolved in methanol each with stirring at 60° C. to make a polymer concentration of 10% by weight to prepare PA resin solutions (PA-1 to PA-3)

(e) Preparation of PVA solutions

Gohsenol GL03 (a product made by Nihon Gohsei Kagaku K.K., Japan; degree of polymerization: 300; degree of saponification: 86.5–89% by mole), Poval PVA 105 (a product made by Kuraray K.K., Japan; degree of polymerization: 500; degree of saponification: 98.5±0.5% by mole), Poval PVA 117 (a product made by Kuraray K.K., Japan; degree of polymerization: 1,700; degree of saponification: 98.5±0.5% by mole), and Poval PVA 224 (a product made by Kuraray K.K., Japan; degree of polymerization: 2,400 degree of saponification: 88.0±1.5% by mole) were dissolved into wafer each with heating and stirring at 60° C. to make a polymer concentration of 15% by weight, thereby preparing aqueous PVA solutions (PV-1 to PV-4).

PREPARATION OF MULTILAYERED LAMINATES

The thus prepared resin emulsion compositions and resin solutions (a), (b), (c), (d) and (e) were applied onto the surface of vapor deposition film of the metal or metal oxide to a predetermined thickness by coating. The thus obtained coating films were air dried for one day and then vacuum dried at 50° C. for 7 days, thereby preparing multilayered laminates of the present invention.

The vapor deposition films using EP and CP and those of comparative Examples 6 and 11 were subjected to undercoating of an aqueous dry laminate adhesive Adcord AD 335E, a product made by Toyo Morton K.K., Japan, to a thickness of about 4 µm on the vapor deposition surface in advance.

The multilayered laminates of Examples and Comparative Examples were subjected to quantitative determination of oxygen transmission rate, flavor preservability test and flexal fatigue test.

Examples 1 to 17

Examples 1 to 3 relate to cases using PVA copolymer emulsions (a), and Examples 4 to 9 to cases using resin emulsion compositions (b). Examples 10 to 12 relate to cases using the compositions (b), while changing the coating thickness, and Examples 13 to 15 to cases using the compositions (b), while changing the PVA content. Example 16 uses CP-5, where freeze deposition at 20° C. for 20 hours, followed by freeze pulverization and freeze drying of the resulting polymers, vacuum drying at 80° C. and extrusion lamination at 220° C., was carried out. Example 17 uses CPP as a substrate for the vapor deposition film.

The flavor preservability test was carried out in Examples 3 and 5, and the flexal fatigue test was carried out in Examples 5 and 7. The results are shown in Table 1.

Comparative Examples 1 to 6

Comparative Examples 1 to 4 relate to cases using only a vapor deposition film. Comparative Example 5 to a case using CP-6 having a PVA content of 10% by weight and Comparative Example 6 to a case using CPP.

The flavor preservability test was carried out in Comparative Example 6 and the flexal fatigue test was carried out in Comparative Example 1. The results are shown in Table 1.

Examples 18 to 30

Examples 18 to 21 relate to cases using EVOH as a vapor deposition film on the PET substrate. Examples 22 to 25 to cases using CPP as a substrate, and Examples 26 to 29 to cases changing the film thickness of EVOH. Example 30 relates to a case of extrusion lamination of Soanol DT at 220° C.

The flavor preservability test was carried out in Examples 18 to 20, 22, 25 and 26. The results are shown in Table 2.

Comparative Examples 7 to 11

Comparative Examples 7 to 10 relate to cases using only the vapor deposition film and Comparative Example 11 to a case using CPP.

The flavor preservability test was carried out in Comparative Example 11 and the flexal fatigue test was carried out in Comparative Example 7. The results are shown in Table 2.

Examples 31 to 43

Examples 31 to 34 relate to cases using PA resin as a vapor deposition film on the PET substrate. Examples 35 to 38 to cases using CPP as the substrate and Examples 39 to 42 to cases changing the film thickness of PA resin.

Example 43 relates to a case of extrusion lamination of nylon-6 at 230° C., where adhesives LX703 and KP90, products made by Dainihon Ink Kagaku Kogyo K.K., Japan, were undercoated at about 3 g/m² at the extrusion lamination.

The flavor preservability test was carried out in Examples 31 to 33 and 39, and the flexal fatigue test was carried out in Examples 31 and 39. The results are shown in Table 3.

Examples 44 to 56

Examples 44 to 49 relate to cases using PVA resin as a vapor deposition film of SiO, Examples 50 to 53 to cases using a vapor deposition film of Al and Examples 54 to 56 to cases changing the coating thickness of PVA resin.

The flexal fatigue test was carried out in Example 46. The results are shown in Table 3.

The present multilayered laminates have a good gas barrier property against an oxygen gas, a good flavor preservability and a good flexal resistance to flexing or bending and can be preferably used as a packaging material for food, medicine, cosmetics, etc. or as a heat-sealable packaging material such as a food-preserving container material requiring a prolonged preservation.

TABLE 1

| | Laminate layer | | | Vapor deposition film layer | | Oxygen transmission rate (ml/m² · day · atm) | | Flavor | | | | | |
|---|---|---|---|---|---|---|---|---|---|---|---|---|---|
| | PVA | Coating | | | Thickness | 23° C., | 23° C., | preservability Distribution ratio | | | | | Flexal fatigue |
| Species | content* (wt. %) | thickness (μm) | Substrate | deposition film spacies | of deposit (Å) | 65% RH | 90% RH | A | B | C | D | E | (runs) |
| Example 1 | EP-1 | 25 | 9 | PET | SiO | 600 | 0.83 | 0.96 | — | — | — | — | — | — |
| Example 2 | EP-2 | 50 | 9 | PET | SiO | 300 | 1.46 | 1.61 | — | — | — | — | — | — |
| Example 3 | EP-2 | 50 | 9 | PET | Al | 300 | 2.34 | 2.51 | 0.56 | 0.51 | 0.14 | 0.13 | 0.11 | — |
| Example 4 | CP-1 | 60 | 9 | PET | SiO | 300 | 1.34 | 1.46 | — | — | — | — | — | — |
| Example 5 | CP-1 | 60 | 9 | PET | SiO | 600 | 0.78 | 0.98 | 1.16 | 1.07 | 0.36 | 0.31 | 0.32 | 250–300 |
| Example 6 | CP-1 | 60 | 9 | PET | SiO | 1100 | 0.57 | 0.68 | — | — | — | — | — | — |
| Example 7 | CP-1 | 60 | 9 | PET | Al | 1100 | 0.61 | 0.72 | — | — | — | — | — | 100–150 |
| Example 8 | CP-2 | 60 | 9 | PET | SiO | 300 | 1.42 | 1.58 | — | — | — | — | — | — |
| Example 9 | CP-2 | 60 | 9 | PET | Al | 600 | 1.89 | 1.98 | — | — | — | — | — | — |
| Example 10 | CP-1 | 60 | 5 | PET | SiO | 600 | 1.24 | 1.52 | — | — | — | — | — | — |
| Example 11 | CP-1 | 60 | 20 | PET | SiO | 600 | 0.59 | 0.68 | — | — | — | — | — | — |
| Example 12 | CP-1 | 60 | 40 | PET | SiO | 600 | 0.38 | 0.44 | — | — | — | — | — | — |
| Example 13 | CP-2 | 15 | 9 | PET | SiO | 600 | 2.91 | 3.13 | — | — | — | — | — | — |
| Example 14 | CP-3 | 35 | 9 | PET | SiO | 600 | 1.38 | 1.49 | — | — | — | — | — | — |
| Example 15 | CP-4 | 80 | 9 | PET | SiO | 600 | 0.76 | 0.88 | — | — | — | — | — | — |
| Example 16 | CP-5 | 60 | 8 | PET | SiO | 600 | 1.84 | 2.14 | — | — | — | — | — | — |
| Example 17 | CP-1 | 60 | 9 | CPP | Al | 500 | 3.58 | 4.02 | — | — | — | — | — | — |
| Comp. Ex. 1 | — | — | — | PET | SiO | 600 | 5.32 | 5.76 | — | — | — | — | — | Less than 10 |
| Comp. Ex. 2 | — | — | — | PET | SiO | 1100 | 3.23 | 3.41 | — | — | — | — | — | — |
| Comp. Ex. 3 | — | — | — | PET | Al | 600 | 5.89 | 5.97 | — | — | — | — | — | — |
| Comp. Ex. 4 | — | — | — | CPP | Al | 500 | 23.6 | 24.2 | — | — | — | — | — | — |
| Comp. Ex. 5 | CP-6 | 10 | 9 | PET | SiO | 600 | 5.29 | 5.74 | — | — | — | — | — | — |
| Comp. Ex. 6 | CPP | — | 50 | PET | SiO | 600 | 4.81 | 5.18 | 5.92 | 6.14 | 0.32 | 0.046 | 0.028 | — |

*PVA content: ratio of polyvinyl alcohol to total of polyvinyl alcohol and vinyl acetate by weight

TABLE 2

| | Laminate layer | | Vapor deposition film layer | Oxygen transmission rate (ml/m² · day · atm) | | Flavor preservability Distribution ratio | | | | | Flexal fatigue |
| | Species | Coating thickness (μm) | Substrate | Vapor deposition film | 23° C., 65% RH | 23° C., 90% RH | A | B | C | D | E | (runs) |
|---|---|---|---|---|---|---|---|---|---|---|---|---|
| Example 18 | EV-1 | 20 | PET | SiO | 0.68 | 0.86 | 0.001 | 0.001 | 0.033 | 0.001 | 0.017 | — |
| Example 19 | EV-1 | 20 | PET | Al | 0.75 | 0.89 | 0.001 | 0.001 | 0.038 | 0.001 | 0.026 | — |
| Example 20 | EV-2 | 20 | PET | SiO | 0.71 | 0.88 | 0.331 | 0.014 | 0.047 | 0.039 | 0.257 | — |
| Example 21 | EV-2 | 20 | PET | Al | 0.79 | 0.95 | — | — | — | — | — | — |
| Example 22 | EV-1 | 20 | CPP | SiO | 0.87 | 1.02 | 0.001 | 0.001 | 0.036 | 0.001 | 0.021 | — |
| Example 23 | EV-1 | 20 | CPP | Al | 0.92 | 1.08 | — | — | — | — | — | — |
| Example 24 | EV-2 | 20 | CPP | SiO | 0.94 | 1.12 | — | — | — | — | — | — |
| Example 25 | EV-2 | 20 | CPP | Al | 1.23 | 1.37 | 0.348 | 0.022 | 0.058 | 0.001 | 0.036 | — |
| Example 26 | EV-3 | 20 | PET | SiO | 0.76 | 0.87 | 0.93 | 0.79 | 0.29 | 0.078 | 0.092 | — |
| Example 27 | EV-3 | 3 | PET | SiO | 1.46 | 1.59 | — | — | — | — | — | — |
| Example 28 | EV-3 | 10 | PET | SiO | 1.18 | 1.32 | — | — | — | — | — | — |
| Example 29 | EV-3 | 60 | PET | SiO | 0.26 | 0.29 | — | — | — | — | — | — |
| Example 30 | EV-4 | 10 | PET | SiO | 1.21 | 1.36 | — | — | — | — | — | — |
| Comp. Ex. 7 | — | — | PET | SiO | 2.66 | 2.68 | — | — | — | — | — | Less than 10 |
| Comp. Ex. 8 | — | — | PET | Al | 1.15 | 1.26 | — | — | — | — | — | — |
| Comp. Ex. 9 | — | — | CPP | SiO | 67.2 | 67.8 | — | — | — | — | — | — |
| Comp. Ex. 10 | — | — | CPP | Al | 70.1 | 70.6 | — | — | — | — | — | — |
| Comp. Ex. | CPP | 60 | PET | SiO | 2.34 | 2.38 | 16.4 | 13.4 | 0.592 | 0.035 | 0.045 | — |

TABLE 3

| | Laminate layer | | Vapor deposition film layer | Oxygen transmission rate (ml/m² · day · atm) | | Flavor preservability Distribution ratio | | | | | Flexal fatigue |
| | Species | Coating thickness (μm) | Substrate | Vapor deposition film | 23° C., 65% RH | 23° C., 90% RH | A | B | C | D | E | (runs) |
|---|---|---|---|---|---|---|---|---|---|---|---|---|
| Example 31 | PA-1 | 20 | PET | SiO | 0.81 | 0.95 | 0.012 | 0.008 | 0.082 | 0.008 | 0.027 | 300–350 |
| Example 32 | PA-1 | 20 | PET | Al | 0.75 | 0.83 | 0.008 | 0.006 | 0.071 | 0.006 | 0.021 | — |
| Example 33 | PA-2 | 20 | PET | SiO | 1.09 | 1.48 | 0.016 | 0.014 | 0.141 | 0.036 | 0.087 | — |
| Example 34 | PA-2 | 20 | PET | Al | 0.98 | 1.26 | — | — | — | — | — | — |
| Example 35 | PA-1 | 20 | CPP | SiO | 2.87 | 3.37 | — | — | — | — | — | — |
| Example 36 | PA-1 | 20 | CPP | Al | 7.18 | 8.32 | — | — | — | — | — | — |
| Example 37 | PA-2 | 20 | CPP | SiO | 3.24 | 3.85 | — | — | — | — | — | — |
| Example 38 | PA-2 | 20 | CPP | Al | 8.64 | 9.28 | — | — | — | — | — | — |
| Example 39 | PA-3 | 20 | PET | SiO | 0.85 | 0.98 | 0.011 | 0.008 | 0.093 | 0.021 | 0.064 | 200–250 |
| Example 40 | PA-1 | 3 | PET | SiO | 2.28 | 2.39 | — | — | — | — | — | — |
| Example 41 | PA-1 | 10 | PET | SiO | 1.42 | 1.51 | — | — | — | — | — | — |
| Example 42 | PA-1 | 50 | PET | SiO | 0.33 | 0.41 | — | — | — | — | — | — |
| Example 43 | PA-4 | 20 | PET | SiO | 0.78 | 0.88 | — | — | — | — | — | — |
| Example 44 | PV-1 | 20 | PET | SiO | 0.87 | 1.26 | — | — | — | — | — | — |
| Example 45 | PV-1 | 20 | CPP | SiO | 1.08 | 1.26 | — | — | — | — | — | — |
| Example 46 | PV-2 | 20 | PET | SiO | 0.69 | 1.06 | — | — | — | — | — | 200–250 |
| Example 47 | PV-2 | 20 | CPP | SiO | 0.91 | 0.98 | — | — | — | — | — | — |
| Example 48 | PV-3 | 20 | PET | SiO | 0.68 | 1.01 | — | — | — | — | — | — |
| Example 49 | PV-4 | 20 | PET | SiO | 0.91 | 1.32 | — | — | — | — | — | — |
| Example 50 | PV-1 | 20 | CPP | Al | 1.34 | 1.46 | — | — | — | — | — | — |
| Example 51 | PV-2 | 20 | PET | Al | 0.43 | 0.65 | — | — | — | — | — | — |
| Example 52 | PV-2 | 20 | CPP | Al | 1.26 | 1.94 | — | — | — | — | — | — |
| Example 53 | PV-4 | 20 | PET | Al | 0.63 | 0.79 | — | — | — | — | — | — |
| Example 54 | PV-2 | 5 | PET | SiO | 2.69 | 3.83 | — | — | — | — | — | — |
| Example 55 | PV-2 | 10 | PET | SiO | 1.27 | 1.91 | — | — | — | — | — | — |
| Example 56 | PV-2 | 50 | PET | SiO | 0.23 | 0.39 | — | — | — | — | — | — |

What is claimed is:

1. A multilayered laminate, which comprises a plastic substrate, a film of a metal or a metal oxide, formed on a surface of the substrate, and a layer formed on a surface of the film, the plastic substrate being selected from the group consisting of polypropylene, poly-4-methylpentene-1, complete saponification products of ethylene/vinyl acetate copolymer, polyacetal, polycarbonate, polyester, polyamide, polyphenylene oxide and polysulfone, the layer being selected from the group consisting of:

(a) a layer formed from a polyvinyl alcohol copolymer emulsion having an ethylene content of 1 to 50% by weight, obtained by aqueous emulsion polymerization of a vinyl acetate monomer, an ethylene monomer and a polyvinyl alcohol, the polyvinyl alcohol initially present in an amount of 15 to 60% by weight based on the total weight of the polyvinyl alcohol and the vinyl acetate monomer;

(b) a layer formed from a resin emulsion composition obtained by mixing (i) a polyvinyl alcohol copolymer emulsion having an ethylene content of 1 to 50% by weight, obtained by aqueous emulsion polymerization of a vinyl acetate monomer, an ethylene monomer and a polyvinyl alcohol, the polyvinyl alcohol initially present in an amount of 3 to less than 15% by weight based on the total weight of the polyvinyl alcohol and the vinyl acetate monomer with (ii) an aqueous solution of polyvinyl alcohol resin, wherein the weight ratio of the weight of the polyvinyl alcohol to the weight of the polyvinyl alcohol and the vinyl acetate monomer in the resin emulsion is 15% or more;

(c) a layer formed from a saponified resin solution of olefin-vinyl acetate copolymer;

(d) a layer formed from a polyamide resin solution; and (e) a layer formed from a polyvinyl alcohol resin solution.

2. A multilayered laminate according to claim 1, wherein the metal is aluminium.

3. A multilayered laminate according to claim 1, wherein the metal oxide is silicon oxide.

4. A multilayered laminate according to claim 1, wherein a layer of the polyvinyl alcohol polymer emulsion (a) is provided on the film of the metal or metal oxide to a thickness of 3 µm or more on a dry basis.

5. A multilayered laminate according to claim 1, wherein a layer is formed from the resin emulsion composition (b) is provided on the film of the metal or metal oxide to a thickness of 3 µm or more on a dry basis.

6. A multilayered laminate according to claim 1, wherein the polyvinyl alcohol resin (b)(ii) comprises a vinyl alcohol constituent unit and a vinyl acetate constituent unit and has a degree of polymerization of 100 to 3,000 and a degree of saponification of 70% by mole or more.

7. A multilayered laminate according to claim 1, wherein a layer of the saponified resin of olefin-vinyl acetate copolymer (c) is provided on the film of the metal or metal oxide to a thickness of at least 1 µm.

8. A multilayered laminate according to claim 1, wherein the olefin of the saponified resin of olefin-vinyl acetate copolymer is ethylene, and the saponified resin has an ethylene content of 15 to 60% by weight and a degree of saponification of vinyl acetate of 90% by mole or more.

9. A multilayered laminate according to claim 1, wherein a layer of the polyamide resin (d) is provided on the film of the metal or metal oxide to a thickness of at least 1 µm.

10. A multilayered laminate according to claim 1, wherein a layer of the polyvinyl alcohol resin (e) is provided on the film of the metal or metal oxide to a thickness of at least 3 µm.

11. A multilayered laminate according to claim 1, wherein the polyvinyl alcohol resin (e) comprises 30 to 100% by mole of vinyl alcohol constituent unit and not more than 70% by mole of vinyl acetate constituent unit, and has a degree of polymerization of 100 to 5,000.

12. A heat-sealable packaging material, which comprises a multilayered laminate comprising a plastic substrate, a film of a metal or a metal oxide, formed on a surface of the substrate, and a layer formed on a surface of the film, the plastic substrate being selected from the group consisting of polypropylene, poly-4-methylpentene-1, complete saponification products of ethylene/vinyl acetate copolymer, polyacetal, polycarbonate, polyester, polyamide, polyphenylene oxide and polysulfone, the layer being selected from the group consisting of:

(a) a layer formed from a polyvinyl alcohol copolymer emulsion having an ethylene content of 1 to 50% by weight, obtained by aqueous emulsion polymerization of a vinyl acetate monomer, an ethylene monomer and a polyvinyl alcohol, the polyvinyl alcohol initially present in an amount of 15 to 60% by weight based on the total weight of the polyvinyl alcohol and the vinyl acetate monomer;

(b) a layer formed from a resin emulsion composition obtained by mixing (i) a polyvinyl alcohol copolymer emulsion having an ethylene content of 1 to 50% by weight, obtained by aqueous emulsion polymerization of a vinyl acetate monomer, an ethylene monomer and a polyvinyl alcohol, the polyvinyl alcohol initially present in an amount of 3 to less than 15% by weight based on the total weight of the polyvinyl alcohol and the vinyl acetate monomer with (ii) an aqueous solution of polyvinyl alcohol resin, wherein the weight ratio of the weight of the polyvinyl alcohol to the weight of the polyvinyl alcohol and the vinyl acetate monomer in the resin emulsion is 15% or more;

(c) a layer formed from a saponified resin solution of olefin-vinyl acetate copolymer;

(d) a layer formed from a polyamide resin solution; and (e) a layer formed from a polyvinyl alcohol resin solution, wherein when the multilayered laminate comprises the polyvinyl alcohol resin, the laminate further comprises a polypropylene layer.

13. A heat-sealable packaging material according to claim 12, wherein the metal is aluminum.

14. A heat-sealable packaging material according to claim 12, wherein the metal oxide is silicon oxide.

15. A heat-sealable packaging material according to claim 12, wherein at least one layer selected from the materials (a), (b), (c), (d) and (e) is provided on the film of the metal or metal oxide to a thickness of 5 µm or more on a dry base.

16. A heat-sealable packaging material according to claim 12, wherein the polyvinyl alcohol resin (b) (ii) comprises a polyvinyl alcohol constituent unit and a vinyl acetate constituent unit and has a degree of polymerization of 100 to 3,000 and a degree of saponification of 70% by mole or more.

17. A heat-sealable packaging material according to claim 12, wherein the olefin of the saponified resin of olefin-vinyl acetate copolymer (c) is ethylene, and the saponified resin has an ethylene content of 15 to 60% by weight and a degree of saponification of vinyl acetate of 90% by mole or more.

18. A heat-sealable packaging material according to claim 12, wherein the polyvinyl alcohol resin (e) comprises 30 to 100% by mole of a polyvinyl alcohol constituent unit and not more than 70% by mole of a vinyl acetate constituent unit and has a degree of polymerization of 100 to 5,000.

* * * * *